Sept. 19, 1961 R. NOACK ET AL 3,000,282
CONTROL MEANS FOR EXPOSURE FACTORS
Filed June 26, 1959 2 Sheets-Sheet 1

INVENTOR
ROLF NOACK
HEINZ SCHULZE
BY
Irvin S. Thompson
ATTORNEY

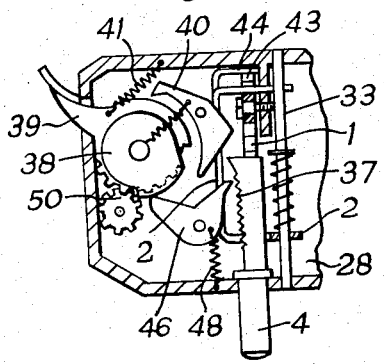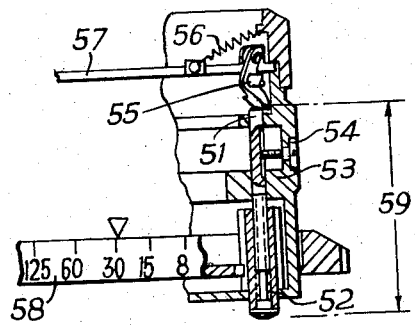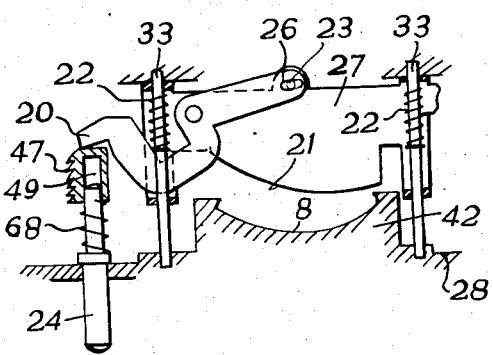

United States Patent Office 3,000,282
Patented Sept. 19, 1961

3,000,282
CONTROL MEANS FOR EXPOSURE FACTORS
Rolf Noack and Heinz Schulze, Dresden, Germany, assignors to VEB Kamera- und Kinowerke Dresden, Dresden, Germany
Filed June 26, 1959, Ser. No. 823,084
7 Claims. (Cl. 95—10)

The present invention relates to a camera control means for exposure factors, in which a pointer influenced by a meter mechanism, for example in the form of a photoelectric exposure meter, is formed as a stop or abutment for a slide member which moves the adjusting means for the exposure factors to be controlled.

The prior known arrangements of this type were of complicated design, especially as regards the necessary addition gear, particularly when it was intended that this addition gear should be suitable for preselecting several exposure factors, so that excessive expense was necessary for the manufacture thereof, whereby the cameras fitted with such arrangements were made more expensive. Furthermore, the reliability in operation was unfavourably influenced especially when toothed wheel gears or lever mechanisms were involved, so that arrangements based on cable connections have particularly been visualized.

The object of the invention is to provide a means for controlling the adjusting means of exposure factors which obviates the disadvantages referred to above, inter alia because of a relatively simple construction requiring little space, operates reliably and if necessary is suitable for the preselection of several exposure factors and also for the requirements of interchangeability of objectives.

According to the invention, this is achieved by the fact that the slide member hereinbefore referred to co-operates through a rod comprising one or more threaded sections with the said adjusting means, the threaded sections being for example coupled through gear wheels with the adjusting means of other exposure factors. In order to be able to use the arrangement for cameras having interchangeable objectives, the light value reduced by the values of the exposure factors which are already set is preferably fed as the value of the "diaphragm" factor through the said rod to a lever connected to the driving ring of an objective diaphragm. By the arrangement of a return travel lock controlled by the running down of the shutter and operating on the release member, the spring-operated slide member is able to hold the diaphragm at the adjusted value until the selected exposure period regulated by the shutter has expired. In accordance with another feature of the invention, it is possible to provide a plurality of rods comprising threaded sections for the purpose of preselecting a plurality of exposure factors. The details of the invention will be seen from the following constructional example shown in diagrammatic form, the regulating means being incorporated into a camera having interchangeable objectives.

In the accompanying drawing:

FIGURE 2 shows the preferred construction of a release member;

FIGURE 3 shows a return travel lock; and

FIGURE 4 shows the design of a suitable objective.

Figure 1:
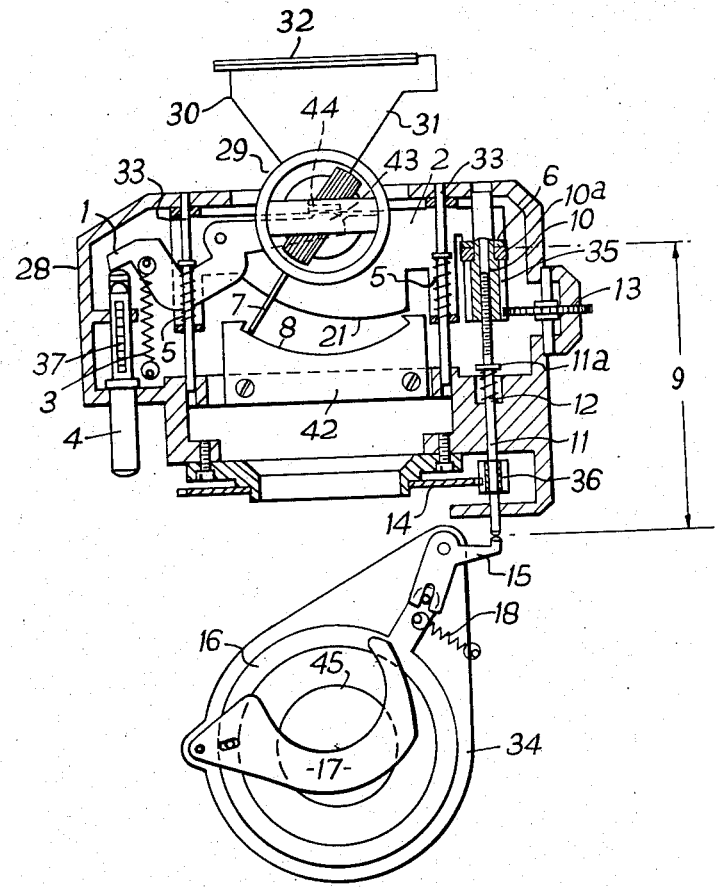
FIGURE 1 is an overall view of an arrangement made in accordance with the invention.

As will be seen from FIGURE 1, the meter mechanism 29 is mounted in the camera housing, the said mechanism being connected to a photoelectric cell 32 by conductor lines 30, 31. Guided on rods 33 is a slide member 2, which is connected to a shutter release member 4 by means of an intermediate lever 1. A transmission rod 9 is provided between the slide member 2 and a bell-crank lever 15. The rod 9 comprises two sections 10, 11, one section threaded into the other. The internally threaded section 10 is formed with a pinion 35 and is provided with a collar 10a which engages both the pinion 35 and a lug 6 on the slide member 2. The collar 10a is urged against the lug 6 by a spring 12 which seats on a further collar 11a on the externally threaded section 11. The bell-crank lever is rotatably mounted on a plate 34 on which also the diaphragm device is mounted. The plate 34 and diaphragm device are fitted into an objective housing (not shown). Pinions 35 and 36 mounted on the threaded sections 10 and 11, respectively, mesh with gear wheels 13 and 14, the first of which in the present case is constructed as a shutter speed setting disc and the second as a setting ring for film sensitivities.

The release member 4 is formed with rack teeth 37 engaged by a locking pawl 46 (see FIGURE 2.) A cam disc 38 co-operating with the locking pawl is connected to a master member 39 of for example a focal-plane shutter, the details of which are not shown. A detent lever 40 secures the master member 39 in the tensioned position against the action of the master spring 41.

The operation of the constructional example illustrated is as follows:

The exposure factor "shutter speed" is transferred through the toothed setting disc 13 and the "film-sensitivity" factor is transferred through the toothed setting ring 14 to the addition device in the form of the transmission rod 9 comprising the two threaded sections 10 and 11. In this way the length of the rod 9 and the diaphragm setting is preset. The camera is now ready for making an exposure provided a control device 39 has also already been moved to the "set" position.

For making the exposure, the camera with the built-in photoelectric cell 32 is pointed towards the subject of the exposure. A pointer 7 is thereby deflected, the said pointer sliding along the internal periphery of a scale 8 on a supporting plate 42.

On actuating the release member 4 and thus the intermediate lever 1 against the action of the return spring 3, the end 43 of the intermediate lever 1 is removed from the lug 44 of the slide member 2, so that springs 5 can become operative. The said slide member 2 is now moved on the rods 33 until a cam 21, which is adapted to the function of the diaphragm aperture movement but which is still self-locking for the pointer 7, engages the said pointer 7. For avoiding deformation effects, the pointer is supported on the arc 8.

During this movement, the rod 9 is displaced axially so that the bell crank lever 15, rotatably mounted on the plate 34, is swivelled, whereby the diaphragm-operating ring 16 is rotated against the action of the spring 18. In this way, the diaphragm blades 17 are brought to the value established by the meter mechanism 29 and the addition device 9 for freeing the light transmission aperture 45.

FIGURE 2 shows the return travel lock for the release member 4. When the photographer removes the pressure from the release member 4, the latter does not immediately return to its rest position, but is held against the action of the return spring 3 by the locking pawl 46, which engages the teeth 37 under the action of the spring 48. It is only when the master control device 39, which is possibly retarded by the escapement 50 which is only partially shown (for example pretimer mechanism, flashlight synchroniser or shutter speed regulator) has returned to the rest position that the locking pawl 46 is removed from the teeth 37 by the cam disc 38, so that the release member 4 can also return to its rest position. Consequently, the relatively strong return spring 3 is now in the position to overcome the springs 5, 12 and 18, so that the diaphragm blades 17 can again completely cover the aperture 45 under the action of the spring 18. (The diaphragm blades 17 can of course also be arranged that when the diaphragm is again completely opened, as is necessary when using single-lens mirror reflex cameras.)

FIGURE 3 shows an arrangement based on a positive pin-and-slot connection 23, 26 between the intermediate lever 20 and the slide member 27. In order not to affect the constant travel of the release member 24 due to the different travel of the slide member 27, a sleeve 49 is fitted over the release member 24. The said sleeve is supported by the spring 68 on the release member 24, so that the movement of the latter is not interrupted when the slide member 27 strikes the pointer 7. The springs 22 disposed around the rods 33 serve as return springs for the sleeve 49 and the slide member 27. The teeth 47 for the return travel lock is in this case advantageously provided on the sleeve 49. In other respects, the operation is the same as that which has already been described above.

In the constructional example according to FIGURE 4, the setting ring 14 (see FIGURE 1) serves as setting member for the film sensitivity and the setting disc 13 serves as setting member for filter factors, although the converse arrangement can be used. The rod accommodates the sum of the factors "film sensitivity" and "filter" and transmits a value corresponding to the sum of the factors "shutter speed" and "diaphragm" to the rod which is mounted in the objective or shutter housing 53 and again consists of two threaded sections 51, 52. One threaded section 51, which is secured against rotation by the the screw 54, is connected through the fixedly mounted double lever 55 to the diaphragm ring 57; the other threaded section 52 meshes with the internally toothed shutter speed setting ring 58 of a built-in between-lens shutter. Under the action of the return spring 56 anchored to the diaphragm ring 57, the rod 59 is forced towards those gearing parts of the new device which are on the camera side. In this connection, it is to be expressly emphasized that it is immaterial as regards the exploitation of the invention whether it is used in conjunction with a focal-plane shutter or a between-lens shutter.

We claim:

1. In a photographic camera including a housing, an exposure meter and pointer device arranged in said housing, a shutter and diaphragm arrangement including shutter and diaphragm blades, a shutter releasing mechanism, and a drive and escapement mechanism for said shutter blades adjustable according to required time exposures, the provision of a diaphragm control and setting arrangement comprising a slide member slidable within said housing which co-operates with said exposure meter pointer and is controlled by said releasing mechanism, resilient means for urging said slidable member in one direction, a diaphragm setting member connected to said diaphragm for setting the aperture of the diaphragm blades, and a transmission element mounted between said slidable member and the diaphragm setting member, said transmission element comprising a plurality of threaded portions connected to each other which portions can be rotated independently and relatively to one another to thereby vary the operative length of connection between the slide member and the setting member.

2. In a photographic camera including a housing, an exposure meter and pointer device arranged in said housing, a shutter and diaphragm arrangement including shutter and diaphragm blades, a shutter releasing mechanism, a drive and escapement mechanism for said shutter blades adjustable according to required time exposures, and time exposure factor setting means connected to said drive and escapement mechanism, the provision of a diaphragm control and setting arrangement comprising a slide member slidable within said housing which co-operates with said exposure meter pointer and is controlled by said releasing mechanism, resilient means for urging said slidable member in a direction to engage said pointer, a diaphragm setting member connected to said diaphragm for setting the aperture of the diaphragm blades, and a transmission element mounted between said slidable member and the diaphragm setting member, said transmission element comprising a plurality of threaded portions connected to each other and rotatable with respect to one another to vary the effective length of said element, one of said portions being coupled to said time exposure factor setting means so as to be simultaneously rotatable with the adjustment of said time exposure factor setting means.

3. In a photographic camera including a housing, an exposure meter and pointer device arranged in said housing, a shutter and diaphragm arrangement including shutter and diaphragm blades, a shutter releasing mechanism, a drive and escapement mechanism for said shutter blades adjustable according to required time exposures, time exposure factor setting means connected to said drive and escapement mechanism, and film sensitivity exposure factor setting means, the provision of a diaphragm control and setting arrangement comprising a slide member slidable within said housing which co-operates with said expose meter pointer and is controlled by said releasing mechanism, resilient means for urging said slidable member in a direction to engage said pointer, a diaphragm setting member connected to said diaphragm for setting the aperture of the diaphragm blades, and a transmission element mounted between said slidable member and the diaphragm setting member, said transmission element comprising a plurality of threaded portions connected to each other and rotatable with respect to one another to vary the effective length of said element, one of said portions being coupled to said time exposure factor setting means so as to be simultaneously rotatable with the adjustment of said time exposure factor setting means, and another of said portions being coupled to said film sensitivity exposure factor setting means so as to be simultaneously rotatable with the adjustment of said film sensitivity exposure factor setting means.

4. A diaphragm control and setting arrangement according to claim 3, wherein gear wheels are provided to couple the threaded portions to said time exposure factor setting means and said film sensitivity exposure factor setting means respectively.

5. A diaphragm control and setting arrangement according to claim 3 in which the diaphragm setting member is a bell-crank lever, one arm of which is connected to the diaphragm and the other arm engaged by one end of said transmission element.

6. A diaphragm control and setting arrangement according to claim 3, including a lever pivotally mounted in the housing, one end of said lever co-operating with said slide member and the other end co-operating with said releasing mechanism, and further resilient means attached to the end of the lever co-operating with said releasing means for urging said slide member in the opposite direction to the direction of the effective force of said first mentioned resilient means.

7. A diaphragm control and setting arrangement according to claim 6, including a locking pawl mounted in said housing, a ratchet arrangement connected to said releasing mechanism with which ratchet said pawl co-operates to hold said releasing mechanism in a depressed condition, a control cam for operating said locking pawl, and a driving device for said control cam operable upon actuation of said shutter.

References Cited in the file of this patent
UNITED STATES PATENTS

| | | |
|---|---|---|
| 1,974,433 | Riszdorfer | Sept. 25, 1934 |
| 2,061,909 | Karg | Nov. 24, 1936 |
| 2,148,963 | Rauch | Feb. 28, 1939 |
| 2,868,095 | Gebele | July 13, 1959 |